United States Patent [19]

Tanaka et al.

[11] Patent Number: 4,557,706
[45] Date of Patent: Dec. 10, 1985

[54] CONTROL SYSTEM FOR CONTINUOUSLY VARIABLE V-BELT TRANSMISSION

[75] Inventors: Yoshikazu Tanaka, Yokohama; Sigeaki Yamamuro, Zushi; Keiju Abo; Hiroyuki Hirano, both of Yokosuka; Haruyoshi Kumura, Yokohama; Yoshiro Morimoto, Yokosuka, all of Japan

[73] Assignee: Nissan Motor Co., Ltd., Yokohama, Japan

[21] Appl. No.: 469,764

[22] Filed: Feb. 25, 1983

[51] Int. Cl.⁴ .............................................. F16H 11/04
[52] U.S. Cl. ............................................ 474/28; 474/18
[58] Field of Search ................... 474/28, 18, 51, 103, 474/110; 137/625.68, 625.69

[56] References Cited

U.S. PATENT DOCUMENTS

| | | | |
|---|---|---|---|
| 3,052,132 | 9/1962 | Dittrich et al. | 474/28 |
| 3,596,528 | 8/1971 | Dittrich et al. | 474/28 |
| 3,600,961 | 8/1971 | Rattunde et al. | 474/28 |
| 4,161,894 | 7/1979 | Giacosa | 474/28 X |
| 4,229,988 | 10/1980 | Rattunde | 474/28 |

FOREIGN PATENT DOCUMENTS

| | | | |
|---|---|---|---|
| 61733 | 10/1982 | European Pat. Off. | 474/28 |
| 2200555 | 7/1973 | Fed. Rep. of Germany | 474/28 |
| 989227 | 4/1965 | United Kingdom | 474/18 |
| 1525674 | 9/1978 | United Kingdom | 474/28 |

Primary Examiner—Stephen J. Novosad
Assistant Examiner—Thuy M. Bui
Attorney, Agent, or Firm—Schwartz, Jeffery, Schwaab, Mack, Blumenthal & Evans

[57] ABSTRACT

A control system for a continuously variable V-belt transmission is disclosed wherein for the purpose of preventing an undesirable rapid drop in pressure in a cylinder chamber of a drive pulley a flow restrictor is provided to restrict the flow of oil discharged from the cylinder chamber upon rapid change in reduction ratio of the continuously variable V-belt transmission.

11 Claims, 12 Drawing Figures

CONTROL SYSTEM FOR CONTINUOUSLY VARIABLE V-BELT TRANSMISSION

BACKGROUND OF THE INVENTION

1. Field of the Invention

The present invention relates to a control system for a continuously variable V-belt transmission, and more particularly to a control system for a continuously variable V-belt transmission where a reduction or transmission ratio is varied in response to an oil pressure building up in a cylinder chamber of a drive pulley and that of a driven pulley.

2. Description of the Prior Art

A known continuously variable V-belt transmission has a V-belt running over a drive pulley and a driven pulley, each having a cylinder chamber with a piston therein and two conical discs, one conical disc of the driven pulley being secured to a drive shaft, one conical disc of the driven pulley being secured to a driven shaft, the other conical disc of the drive pulley being controllably movable in an axial direction of the drive shaft in response to an oil pressure in the cylinder chamber thereof, the other conical disc of the driven pulley being controllably movable in an axial direction of the driven shaft in response to an oil pressure in the cylinder chamber thereof. The oil pressure in the cylinder chamber of the drive pulley and that of the driven pulley is determined by a shift control valve as illustrated in FIG. 1. Referring to FIG. 1, the known shift control valve denoted generally by the reference numeral 200 comprises a valve bore 201 and five ports, viz., a first drain port 201a, a first outlet port 201b, an inlet port 201c, a second outlet port 201d, and a second drain port 201e. Slidably disposed in the valve bore 201 is a spool 202 having four lands, viz., a first endmost land 202a, a first control land 202b, a second control land 202c, and a second endmost land 202d. The inlet port 201c is supplied with a pressure oil under line pressure via an oil conduit 203, the first outlet port 201b communicates with a cylinder or servo chamber of a drive pulley and the second outlet port 201d communicates with a cylinder or servo chamber of a driven pulley. The first drain port 201a and second drain port 201e communicate with an oil tank. The left end of the spool 202 is linked to a lever of a shift operating mechanism, not illustrated in FIG. 1. The control lands 202b and 202c are cooperable with the outlet ports 201b and 201d, respectively. Each of the outlet ports 201b and 201d is in the form of an annular recess having a width slightly greater than the width of the respective control lands 202b and 202c. Assuming that the control land 202b is in its central position relative to the outlet port 201b, the oil under line pressure supplied via the port 201 to an annular chamber defined between the lands 202b and 202c flows into the port 201b via a clearance formed by one edge of the land 202b, but a portion of the oil flows out of the port 201a via another clearance formed by the other edge of the control land 202b toward the drain port 201a. Thus, the pressure in the port 201b, viz., the pressure in the cylinder chamber of the drive pulley, is determined by the ratio in area between the clearances formed on the opposite sides of the control land 202b. Assuming that the land 202c is in its central position relative to the outlet port 201d, the oil under line pressure supplied to the annular chamber between the lands 202b and 202c flows into the port 201d via a clearance formed by one edge of the control land 202c, but a portion of the oil flows out of the port 201d via another clearance formed by the other edge of the control land 202c toward the drain port 201e. Thus, the pressure in the outlet port 201d is determined by the ratio in areas between the clearances on the opposite sides of the control land 202c. This pressure builds up in the cylinder chamber of the driven pulley via the oil conduit 205. When the control lands 202b and 202c are in their central position relative to the respective outlet ports 201b and 201d as illustrated in FIG. 1, the same pressure builds up in the oil conduit 204 as well as in the oil conduit 205 since the control lands 202b and 202c assume the same relationship with the respective outlet ports 201b and 201d. If the spool 202 is shifted to the left as viewed in FIG. 1, the pressure side clearance formed on that side of the control land 202b which is near the inlet port 201c increases and the drain side clearance formed on that side of the control land 202b which is near the drain port 201a decreases, resulting in an increase in pressure in the conduit 204 leading to the cylinder chamber of the drive pulley. At the same time the pressure side clearance of the control land 202c decreases and the drain side clearance of the control land 202c increases, resulting in a reduction in pressure in the conduit 205 leading to the cylinder chamber of the driven pulley. This results in a smaller reduction ratio. If the spool 202 is shifted toward the right as viewed in FIG. 1, there occurs a reduction in pressure in the conduit 204 leading to the cylinder chamber of the drive pulley and at the same time an increase in pressure in the conduit 205 leading to the cylinder chamber of the driven pulley. This results in a larger reduction ratio.

The known control system has a problem that the V-belt slips upon rapid acceleration since the pressure in each of the cylinder chambers of the drive and driven pulleys drops rapidly. Upon rapid acceleration the spool 202 is shifted by the shift operating mechanism toward the right to a position illustrated in FIG. 2. As a result of this rapid rightward movement of the spool 202, a considerable amount of oil is discharged toward the drain port 201a via the drain clearance of the control land 202b which has increased its area rapidly. Consequently, the pressure in the cylinder chamber of the drive pulley drops rapidly and below its required minimum level shown by dotted line in FIG. 3, resulting in a slip between the V-belt and the drive pulley. The occurrence of the slip causes a decrease in tension of the V-belt, resulting in rapid reduction in an axial spreading force applied by the V-belt on the driven pulley. As a result, the axially movable conical disc of the driven pulley is allowed to move toward the V-belt. This movement of the movable conical disc of the driven pulley is quicker than the movement of the movable conical disc hydraulically in response to pressure build-up in the cylinder chamber of the driven pulley. The result thereof is that the pressure in the cylinder chamber of the driven pulley also drops rapidly and below its required minimum level shown by dotted line in FIG. 3, allowing the V-belt to slip. As a result, the engine races upon rapid acceleration owing to the slip of the V-belt.

SUMMARY OF THE INVENTION

An object of the present invention is to provide a control system for a continuously variable V-belt transmission which prevents the occurrence of a slack in the V-belt upon rapid change in reduction ratio.

Another object of the present invention is to provide a control system for a continuously variable V-belt transmission wherein an undesirable drop in fluid pressure in a cylinder chamber of a pulley which occurs upon rapid change in reduction ratio such as upon rapid acceleration.

According to the present invention, a control system for a continuously variable V-belt transmission is provided wherein a flow restrictor restricts the flow of oil discharged from a cylinder chamber of a conical pulley for the purpose of preventing the undesirable drop in fluid pressure in the cylinder chamber upon rapid change in reduction ratio of the continuously variable V-belt transmission.

BRIEF DESCRIPTION OF THE DRAWINGS

The present invention is more specifically described in connection with the accompanying drawings, wherein:

FIGS. 1 and 2 are diagrammatic cross sections of the prior art shift control valve discussed above wherein FIG. 1 illustrates the state when the spool is in its central position and FIG. 2 illustrates the state which the shift control valve assumes upon rapid acceleration;

DETAILED DESCRIPTION OF THE INVENTION

Referring to FIGS. 4 through 12, the present invention is described hereinafter in connection with various preferred embodiments.

Figure 1:
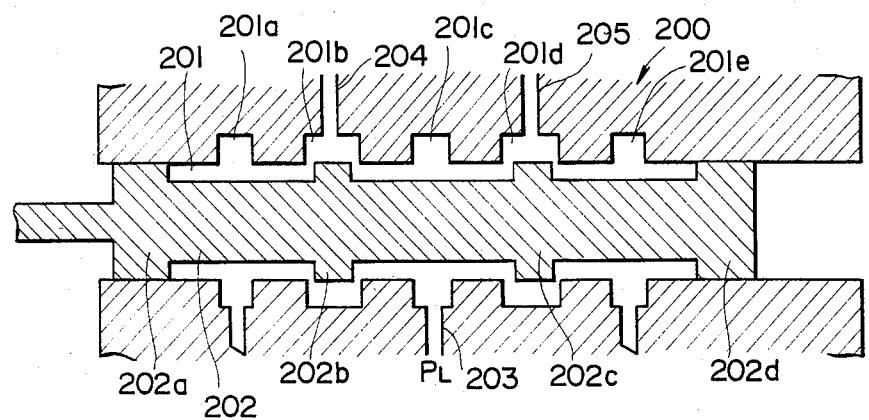
Figure 2:
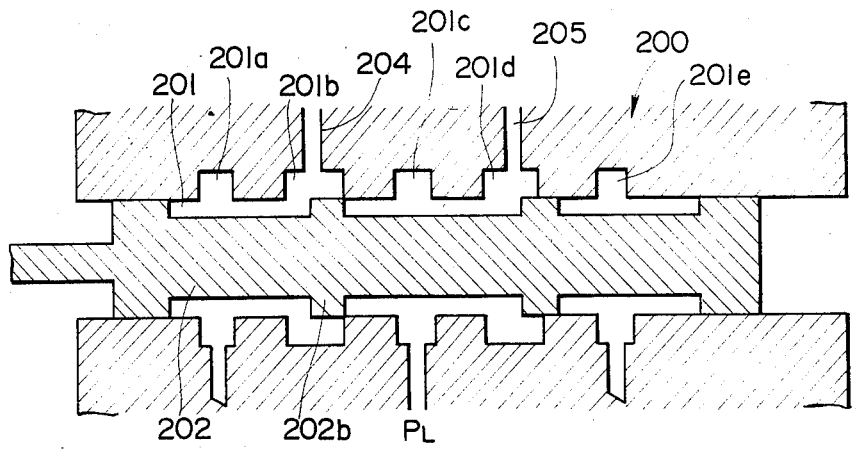
Figure 3:
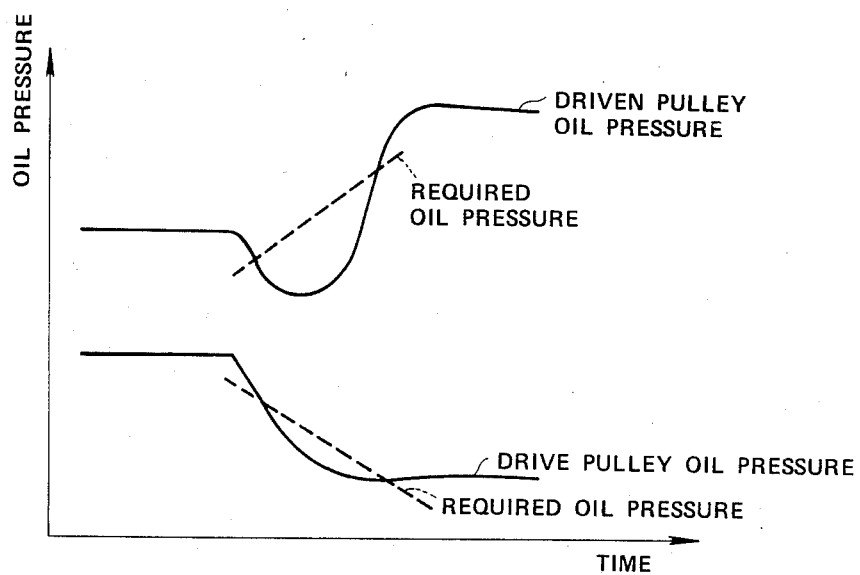
FIG. 3 is a graph showing the variation in pressure in each of the drive and driven pulley cylinder chambers upon rapid acceleration.
Figure 4:
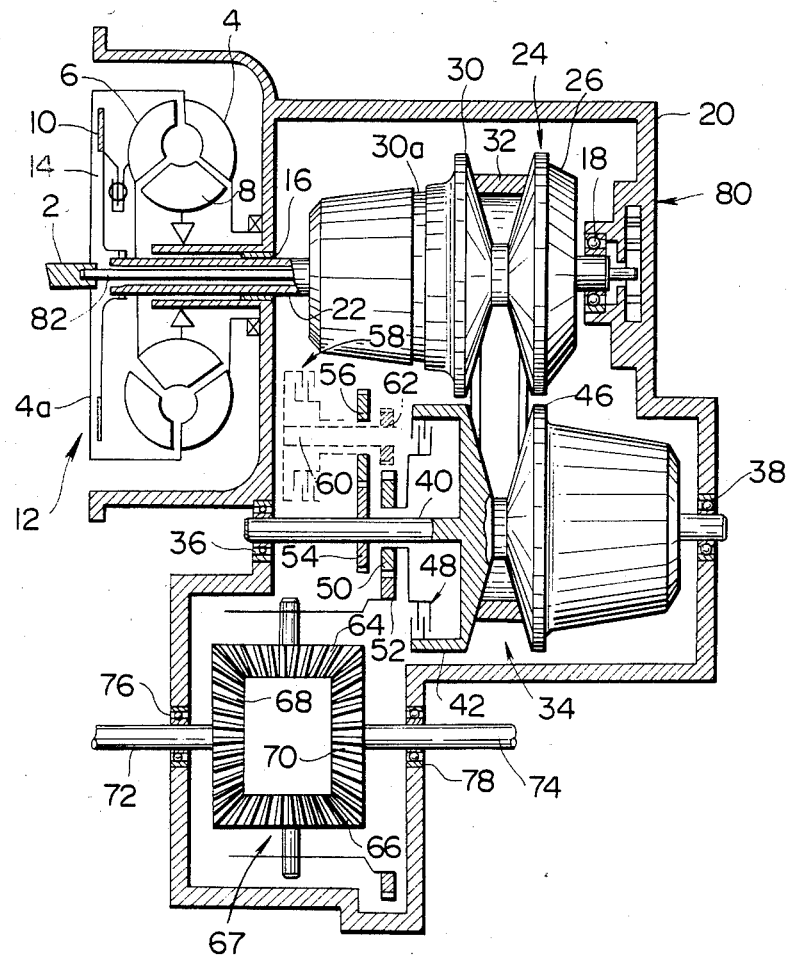
FIG. 4 is a diagrammatic view illustrating a power transmission mechanism of a continuously variable V-belt transmission.
Figure 5:
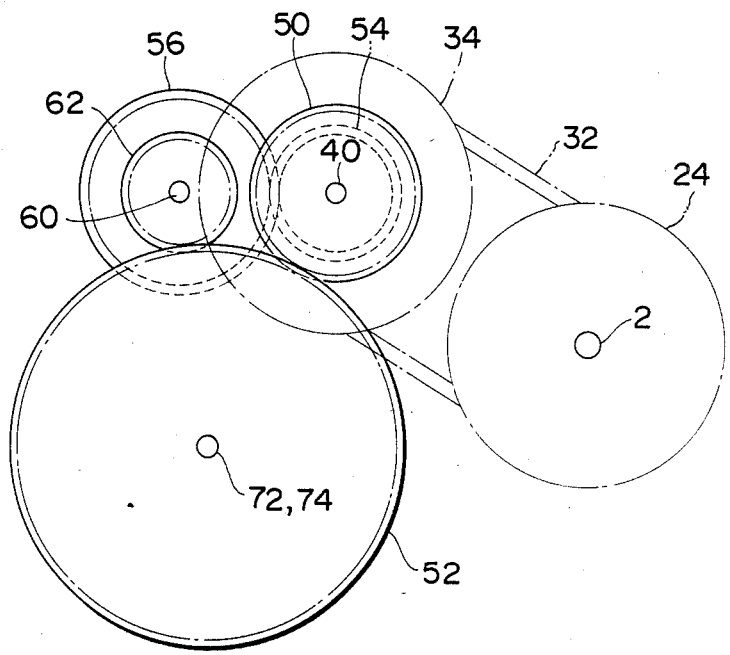
FIG. 5 is a layout of the shafts of the transmission mechanism shown in FIG. 4.

Referring firstly to FIGS. 4 and 5, the power transmission mechanism of the continuously variable V-belt transmission is explained.

Referring to FIG. 4, a torque converter 12 (which may be replaced with a fluid coupling) includes a pump impeller 4, a turbine runner 6, a stator 8 and a lock-up clutch (lock-up device) 10. The lock-up clutch 10 is connected to the turbine runner 6 in an axially slidable manner and cooperates with a member (converter shell) 4a coupled with an engine output shaft 2 integral with the pump impeller 4 to define a lock-up clutch oil chamber 14. The lock-up clutch 10 operates such that when the oil pressure within the lock-up clutch oil chamber 14 becomes lower than that within the interior of the torque converter 12, the lock-up clutch 10 is pressed against the member 4a by the pressure difference to come into a unitary rotation therewith. The turbine runner 6 is splined to one end of a drive shaft 22 which is rotatably supported by a case 20 via bearings 16 and 18. Arranged on the drive shaft 22 between the bearings 16 and 18 is a drive pulley 24. The drive pulley 24 comprises an axially fixed conical disc 26 secured to the drive shaft 22 and an axially movable conical disc 30 which is disposed to face the axially fixed conical disc 26 to define a V-shaped pulley groove therebetween and which is controllably movable in an axial direction of the drive shaft 22 in response to an oil pressure created within a drive pulley cylinder chamber 28 (see FIG. 6). The drive pulley 34 is drivingly connected to a driven pulley 34 by a V-belt 32. The V-belt 32 runs over the drive pulley 24 and the driven pulley 34. The driven pulley 34 is arranged on a driven shaft 40 which is rotatably supported by the case 20 via the bearings 36 and 38. The driven pulley 34 comprises an axially fixed conical disc 42 secured to the driven shaft 40 and an axially movable conical disc 46 which is disposed to face the fixed conical disc 42 in such a manner as to define a V-shaped pulley groove and which is controllably movable in an axial direction of the driven shaft 40 in response to an oil pressure created in a driven pulley cylinder chamber 44 (see FIG. 6). The axially fixed conical disc 42 is drivingly connectable via a forward drive multiple disc clutch 48 to a forward drive gear 50 rotatably supported on the driven shaft 40, this forward drive gear being in mesh with a ring gear 52. Fixedly mounted to the driven shaft 40 is a reverse drive gear 54 which is in mesh with an idler gear 56. The idler gear 56 is drivingly connectable via a reverse drive multiple disc clutch 58 to an idler shaft 60 which has fixed thereto another ilder gear 62 that is in mesh with the ring gear 52. (In FIG. 4 the idler gear 62, idler shaft 60 and reverse drive multiple disc cluth 58 are illustrated in positions displaced from the actual positions thereof for ease of illustration. Therefore, although the idler gear 62 and ring gear 52 are shown as out of mesh with each other, they are actually in mesh with each other as shown in FIG. 5.) The ring gear 52 has attached thereto a pair of pinion gears 64 and 66. A pair of axle shafts 72 and 74 are coupled with side gears 68 and 70, respectively, which are in mesh with the pinion gears 64 and 66 to cooperate to form a differential 67. The axle shafts 72 and 74 are supported via bearings 76 and 78, respectively, extend outwardly of the case 20 in the opposite directions and are connected to road wheels (not shown), respectively. As viewed in FIG. 4, there is arranged on the righthand side of the bearing 18 an oil pump 80 of the internally toothed gearing type which serves as a source of oil pressure, this oil pump 80 being driven by the engine output shaft 2 via an oil pump drive shaft 82 extending through the hollow drive shaft 22. Rotational power fed from the engine output shaft 2 is transmitted via torque converter 12, drive shaft 22, drive pulley 24, V-belt 32, and driven pulley 34 to driven shaft 40 and in the case where the forward multiple disc clutch 48 is engaged with the reverse drive multiple disc clutch 58 released, the rotation of the shaft 40 is transmitted via the forward drive gear 50, ring gear 52 and differential 67 to the output shafts 72 and 74 to rotate them in the forward rotational direction, whereas, in the case where the reverse drive multiple disc clutch 58 is engaged with the forward drive multiple disc clutch 48 released, the rotation of the shaft 40 is transmitted via the reverse drive gear 54, idle gear 56, idle shaft 60, idle gear 62, ring gear 52 and differential 67 to the output shafts 72 and 74 to rotate them in the reverse rotational direction. During this transmission of power, a ratio between the rotation of the drive pulley 24 and that of the driven pulley 34 may be varied by moving the axially movable conical disc 30 of the drive pulley 24 and the axially movable conical disc 46 of the driven pulley 34 so as to change the radii of the diameter contacting with the V-belt 32. For example, increasing the width of the V-shaped pulley groove of the drive pulley 24 and decreasing the width of the V-shaped pulley groove of the driven pulley 34 will result in a reduction in radius of the diameter of the drive pulley 24 contacting with the V-belt 32 and an increase in radius of the diameter of the driven pulley 34 contacting with the V-belt 32. As a result, a reduction ratio increases. If the axially movable conical discs 30 and 46 are moved in the reverse directions, a reduction ratio decreases.

Figure 6:
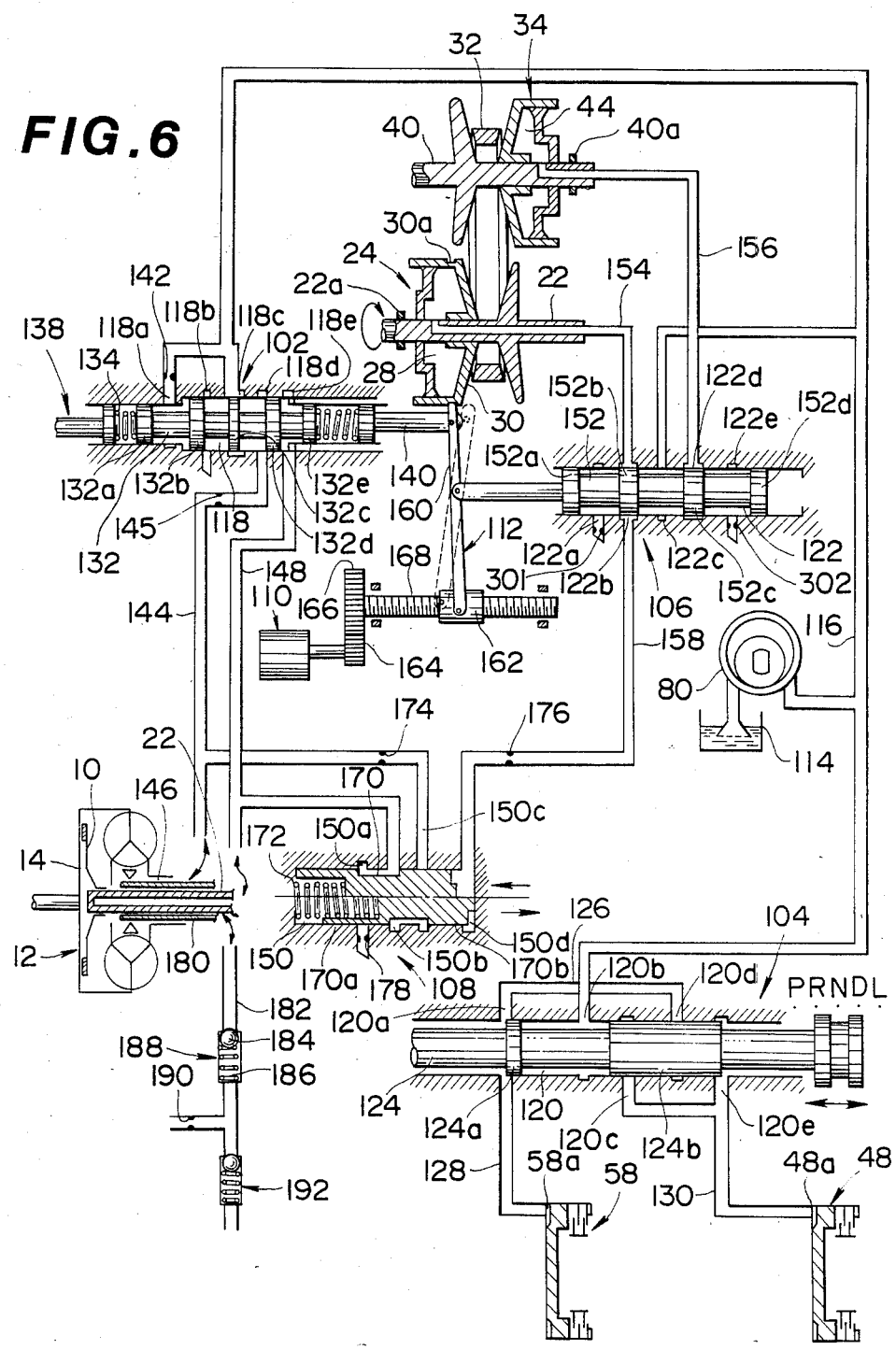
FIG. 6 is a control system for the continuously variable V-belt transmission shown in FIGS. 4 and 5.

Referring to FIG. 6, a control system for the continuously variable transmission is explained. As shown in FIG. 6, the control system comprises an oil pump 80, a line pressure regulator valve 102, a manual valve 104, a shift control valve 106, a lock-up valve 108, a shift motor 110, and a shift operating mechanism 112.

The oil pump 80 which is driven by the engine output shaft 2 draws off the oil from the tank 114 and discharges the oil under pressure into the oil conduit 116. The oil conduit 116 leads to ports 118a and 118c of the line pressure regulator valve 102 where the oil is regulated to generate a pressure oil under line pressure. The oil conduit 116 communicates with a port 120b of the manual valve 104 and a port 122c of the control valve 106.

The manual valve 104 has a valve bore 120 provided with five ports 120a, 120b, 120c, 102d and 120e, and a spool 124 with two lands 124a and 124b received in the valve bore 120. The spool 124 is actuated by a shift lever (not shown) between five detent positions "P", "R", "N", "D" and "L". The port 120a is permitted to communicate not only with a port 120d via an oil conduit 126, but also with a cylinder chamber 58a of the reverse drive multiple disc clutch 58. A port 120c is permitted to communicate not only with a port 120e by an oil conduit 130, but also with a cylinder chamber 48a of a forward drive multiple disc clutch 48. The port 120b communicates with the oil conduit 116 to receive line pressure therein. When the spool 124 is set in "P" positions, the port 120b supplied with the line pressure is covered by a land 124b, so that oil is discharged from the cylinder chamber 58a of the reverse drive multiple disc clutch 58 via the oil conduit 126 and port 120d. At the same time oil is discharged from the cylinder chamber 48a of the forward drive multiple disc clutch 48 via the port 120e. When the spool 124 is set in "R" position, the port 120b is permitted to communicate with the port 120a by a groove between the lands 124a and 124b so as to admit the line pressure to the cylinder chamber 58a for the reverse drive multiple disc clutch 58, whereas, the cylinder chamber 48a of the forward drive multiple disc clutch 48 is left drained via the port 120e. When the spool 124 is set in "N" position as illustrated in FIG. 6, the port 120b is prevented from communicating with the other ports, thus the cylinder chamber 58a of the reverse drive multiple disc clutch 58 and the cylinder chamber 48a of the forward drive multiple disc clutch 48 are drained via the port 120a and port 120e in a similar manner to the case when the spool 124 is in "P" position. When the spool 124 is set in "D" or "L" position, the port 120b is permitted to communicate with the port 120c so that pressure oil under line pressure is supplied to the cylinder chamber 48a of the forward multiple disc clutch 48, whereas, the cylinder chamber 58a of the reverse drive clutch 58 is drained via the port 120a. Thus, when the spool 124 is set in "P" position or "N" position, both the forward drive multiple disc clutch 48 and reverse drive multiple disc clutch 58 are released to interrupt the transmission of power, thus preventing the rotation of axle shafts 72 and 74; when the spool 124 is set in "R" position, the reverse drive multiple disc clutch 58 is engaged so as to drive the axle shafts 72 and 74 in the reverse rotational direction; when the spool 124 is set in "D" or "L" position, the forward drive multiple disc clutch 48 is engaged so as to drive the axle shafts 72 and 74 in the forward rotational direction. Although there occurs no difference between a hydraulic circuit established in the case of selection of "D" position and that in the case of selection of "L" position as mentioned above, both of the positions are electrically detected and the shift motor 110 is actuated in such a manner as to provide different shift patterns.

The line pressure regulator valve 102 comprises a valve bore 118 provided with five ports 118a, 118b, 118c, 118d and 118e, a spool 132 with five lands 132a, 132b, 132c, 132d and 132e, and springs 134 and 136 arranged on the both ends of the spool 132. It is to be noted that the lands 132a and 132e provided on the both end portions of the spool 132 are smaller in diameter than the intermediate lands 132b, 132c and 132d. The spring 134 is disposed between the left end of the spool 132 and a throttle link 138. The throttle link 138 is moved to the left as viewed in FIG. 6 as the throttle opening degree increases and moved to the right as the throttle opening degree decreases. Thus, if the throttle opening degree is great, the force created by the spring 134 and biasing the spool 132 to the right is small, whereas, if the throttle opening degree is small, the force by the spring 134 biasing the spool rightwardly is great. The other spring 136 is disposed between the right end of the spool 132 and a rod 140 cooperating with the axially movable conical disc 30 of the drive pulley 34. Thus, if the axially movable conical disc 30 of the drive pulley 24 moves to the right as viewed in FIG. 6 (viz., in the case a reduction ratio is to be decreased), the force by the spring 136 biasing the spool 132 to the left decreases, whereas, if the axially movable conical disc 30 moves to the left (viz., in the case of a reduction ratio is to be increased), the force by the spring 136 biasing the spool 132 to the left increases. As mentioned before, the ports 118a and 118c of the line pressure regulator valve 102 are supplied with the pressure oil discharged by the oil pump 80. The port 118a is provided with an orifice 142. The port 118b serves as a drain port, the port 118d is connected by an oil conduit 144 to an inlet port 146 of the torque converter 12 and a port 150c of the lock-up valve 108, the port 118e communicates via an oil conduit 148 with the lock-up clutch oil chamber 14 within the torque converter 12 and with a port 150b of the lock-up valve 108. For preventing the application of an excessive pressure to the interior of the torque converter 12, the oil conduit 144 is provided with an orifice 145. Two forces act on the spool 132 of the line pressure regulator valve 102 in the rightward direction, one by the spring 134 and the other by the line pressure acting on a differential area between the lands 132a and 132b. Two forces act on the spool 132 in the leftward direction, one by the spring 134 and the other by the pressure at the port 118e acting upon a differential area between the lands 132d and 132e. The spool 132 effects pressure regulation to provide line pressure at the port 118c by adjusting the amount of drainage of the oil via the ports 118d and 118b and stays in a position where the leftward forces balance with the rightward forces. The line pressure at the port 118c increases as the throttle opening degree increases, as a reduction ratio increases, and as the pressure at the port 118e (viz., the oil pressure building up within the lock-up clutch oil chamber 14) increases. Because the oil pressure exists in the chamber 14, the torque converter 12 is in its non lock-up state. The variation of the line pressure in this manner meets the actual demands, viz., the line pressure should be increased to increase a bracing force with which each of the pulleys 24 and 34 are biased against the V-belt 32 in response to an increase in the torque to be transmitted which increases as the throttle opening degree increases and as the reduction ratio increases. Besides, the line pressure should be increased as the torque multiplication by the torque converter 12 increases.

Figure 7:
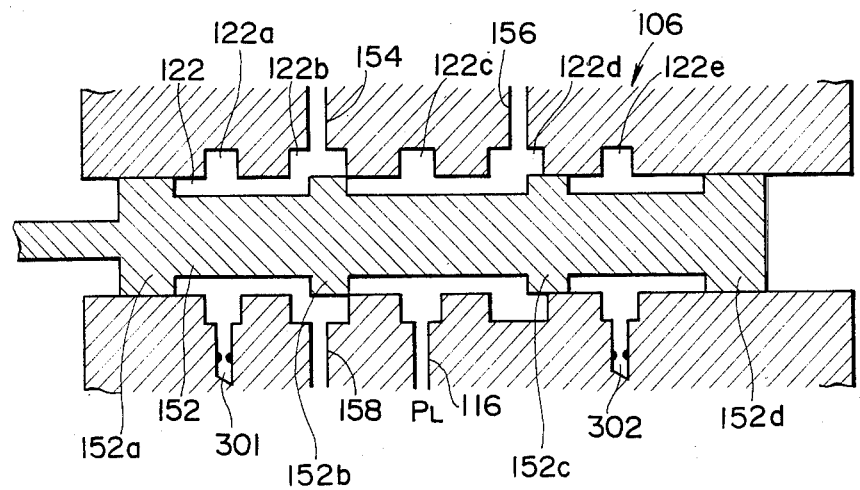
FIG. 7 is an enlarged cross section of a shift control valve shown in FIG. 6.

Referring to FIGS. 6 and 7, the shift control valve 106 has a valve bore 122 and five ports, viz., a first drain port 122a, a first outlet port 122b, an inlet port 122c, a second outlet oort 122d and a second drain port 122e. Slidably mounted in the valve bore 122 is a spool 152 having four lands, viz., a first endmost land 152a, a first control land 152b, a second control land 152c and a second endmost land 152d. The inlet port 122c is supplied with a pressure oil under line pressure via the oil conduit 116. The first outlet port 122b communicates with a cylinder chamber 28 of the drive pulley 24 via an oil conduit 154 and the second outlet port 122d communicates with a cylinder chamber 44 of the driven pulley 34 via an oil conduit 156. The first outlet port 122b communicates also with a port 150d of the lock-up valve 108 via an oil conduit 158. The outlet of the first drain port 122a is provided with a flow restrictor in the form of an orifice 301 for the purpose of restricting the flow of oil discharged from the cylinder chamber 28 of the drive pulley 24. The outlet of the drain port 122e is provided with a flow restrictor in the form of an orifice 302 for restricting the flow of oil discharged from the cylinder chamber 44 of the driven pulley 34. The left end of the spool 152 is linked to a center portion of a lever 160 of the shift operating mechanism 112. The control lands 152b and 152c are cooperable with the outlet ports 122b and 122d, respectively. Each of the outlet ports 122b and 122d is in the form of an annular recess having a width slightly greater than the width of the respective control lands 152b and 152c. Annular remote edges of the control lands 152b and 152c are spaced by substantially the same distance as the remote side walls of outlet ports 122b and 122d are spaced. Assuming that the control land 152d is in its central position relative to the outlet port 122b, the pressure oil under line pressure supplied via the oil conduit 116 to an annular chamber between the control lands 152b and 152c flows into the outlet port 122b via a clearance formed by one edge of the control land 152b, but a portion of the oil flows out of the outlet port 122b via another clearance formed by the other edge of the control land 152b toward the drain port 122a. Thus, the pressure in the outlet port 122b, viz., the pressure in the cylinder chamber 28 of the drive pulley 24, is determined by the ratio in areas between the clearances formed on the opposite sides of the control land 152b. Similarly, the pressure in the outlet port 122d, viz., the pressure in the cylinder chamber 44 of the driven pulley 34, is determined by the ratio in area between clearance formed on the opposite sides of the control land 152c.

When the spool 152 is in its central position, the same pressure builds up in the cylinder chamber 28 of the drive pulley 24 and in the cylinder chamber 44 of the driven pulley 34 since the control lands 152b and 152c assume the same relationship with the respective outlet ports 122b and 122d. If the spool 152 is shifted to the left as viewed in FIG. 6, the pressure side clearance formed on that side of the control land 152b which is near the inlet port 122c increases and the drain side clearance formed on that side of the control land 152b which is near the drain port 122a decreases, resulting in an increase in pressure in the conduit 154 leading to the cylinder chamber 28 of the drive pulley 24. At the same time the pressure side clearance of the control land 152c decreases and the drain side clearance of the control land 152c increases, resulting in a reduction in pressure in the conduit 156 leading to the cylinder chamber 44 of the driven pulley 34. This results in an increases in radius of the diameter of the drive pulley 24 contacting with the V-belt 32 and a reduction in radius of the diameter of the driven pulley 34 contacting with the V-belt 32. Thus, the reduction ratio decreases. If the spool 152 is shifted to the right as viewed in FIG. 6, the reduction ratio increases as will be readily understood.

The lever 160 of the shift operating mechanism 112 has its one end received in an annular groove 30a formed in the axially movable conical disc 30 of the drive pulley 24 and has its opposite end pin connected with the sleeve 162. The sleeve 162 is internally threaded to mesh with the thread formed on the shaft 168 which is rotatable by the shift motor 110 via the gears 164 and 166. With this shift operating mechanism 112, if the shift motor 110 is rotated to rotate the shaft 168 via the gears 164 and 166 in one rotational direction to cause the sleeve 162 to move leftwardly, the lever 160 moves in a clockwise rotational direction with its end portion received by the annular groove 30a of the axially movable conical disc 30 of the drive pulley 24 as an fulcrum point, causing the leftward movement of the spool 152 connected to the lever 160 of the shift control valve 106. This causes a rightward movement of the axially movable conical disc 30 of the drive pulley 24 in a manner mentioned before to decrease the width of the V-shaped pulley groove, while, at the same time, the width of the V-shaped pulley groove of the driven pulley 34 increases, thus causing the reduction ratio to decrease. Since the one end of the lever 160 is engaged with the groove 30a around the outer periphery of the axially movable conical disc 30, moving the axially movable conical disc 30 rightwardly results in a clockwise movement of the lever 160 with that end of the lever 160 which is pin connected with the sleeve 162 as a fulcrum. This clockwise movement of the lever 160 causes the spool 152 to move back rightwardly, tending to render the drive pulley 24 and driven pulley 34 to assume the state accomplishing a small reduction ratio. This action causes the spool 152, the drive pulley 24 and driven pulley 34 to assume a state accomplishing a reduction ratio depending upon the amount of rotation of the shift motor 110. The same is true if the shift motor 110 is rotated in the reverse direction. Therefore, if the shift motor 110 is actuated in accordance with a predetermined shift pattern, the reduction ratio varies accordingly, thus making it possible to control the shift in the continuously variable transmission by controlling the shift motor 110, alone.

The shift motor 110 is controlled by a control unit, not illustrated, which detects a revolution speed of the drive pulley 24 and a parameter indicative of the output torque of the engine, such as a throttle opening degree, wherein a desired value in engine revolution speed is determined using a predetermined function which defines for any value in the parameter indicative of the output torque of the engine a desired value in engine revolution speed. The control unit operates the shift motor 110 to control the reduction ratio in such a manner as to maintain the revolution speed of the drive pulley in a predetermined relationship with the desired value in engine revolution speed.

The lock-up valve 108 comprises a valve bore 150 formed with four ports 150a, 150b, 150c and 150d, a spool 170 having two lands 170a and 170b, and a spring 172 biasing the spool 170 rightwardly. The port 150d communicates with a port 122b of the shift control valve 106 through an oil conduit 158, the ports 150b and 150c communicate respectively through oil conduits 148 and 144 with the port 118e of the line pressure regulator valve 102 and the port 118d thereof, and the port 150a is drained. The oil conduits 144 and 158 and a drain oil conduit extending from the port 150a are provided with orifices 174, 176 and 178, respectively. The same oil pressure as that applied to the torque converter inlet port 146 is applied to the port 150c via the oil conduit 144, but when the oil pressure applied to the port 150d via the oil conduit 158 (the same oil pressure as that within the drive pulley cylinder chamber 28) is high enough to press the spool 170 to the left against the force of the spring 172, the port 150c is closed by the land 170b and the port 150b is drained via the port 150a. Therefore, the lock-up clutch oil chamber 14 which communicates with the port 150b via the oil conduit 148 is drained, thus permitting the lock-up clutch 10 to be engaged by the pressure within the torque converter 12, rendering the torque converter to operate in the lock-up state. Conversely, if the oil pressure at the port 150d decreases and the leftwardly directed force becomes smaller than the rightwardly directed force due to the spring 172, the spool 170 moves rightwardly to a position where the port 150b is allowed to communicate with the port 150c. This causes the oil conduit 148 to communicate with the oil conduit 144, allowing the same pressure as that applied to the torque converter inlet port 146 to reach the lock-up clutch oil chamber 14, allowing the same pressure to build up on the both sides of the lock-up clutch 10, resulting in the release of the lock-up clutch 10. The orifice 178 is provided to prevent rapid drainage of the pressure oil from the lock-up clutch oil chamber 14 so as to alleviate a shock upon shifting into the lock-up state, whereas, the orifice 174 is provided in the oil conduit 144 to permit a gradual increase in the oil pressure within the lock-up oil chamber 14 so as to alleviate a shock upon release of the lock-up state. An orifice 176 is provided in an oil conduit 158 to prevent the occurrence of a chattering in the lock-up valve 108 owing to small variation in oil pressure in the cylinder chamber 28 of the drive pulley 24.

The torque converter outlet port 180 communicates with the oil conduit 182 which is provided with a relief valve 188 including a ball 184 and a spring 186 and thus, with this relief valve, the pressure within the torque converter 12 is maintained constant. The oil downstream of the relief valve 188 is introduced by an oil conduit 190 to an oil cooler and a lubricant circuit, both being unillustrated, and is finally drained, whereas, an excessive oil is drained by another relief valve 192, the thus drained oil being returned finally to the tank 114.

Referring particularly to FIG. 7, the shift control valve 106 is further described. Upon rapid acceleration, the shift motor 110 is actuated to move the sleeve 162 rightwardly as viewed in FIG. 6 to move the spool 152 rapidly in the rightward direction via the shift operating mechanism 112 until the spool 152 assumes a position illustrated in FIG. 7. In the illustrated position of the spool 152, the pressure oil under line pressure supplied via the inlet port 122c enters into the cylinder chamber 28 of the driven pulley 24 via the outlet port 122e, while the pressure oil is discharged from the cylinder chamber 28 of the drive pulley 24. The oil discharged from the cylinder chamber 44 of the driven pulley 34 flows through the drain side clearance of the control land 152b without being subject to any flow restriction and then enters into the drain port 122a. Because the flow of oil discharged from the cylinder chamber 28 of the drive pulley 24 is throttled or restricted by the orifice 301, a rapid reduction in pressure in the cylinder chamber 28 of the drive pulley 24 upon rapid acceleration is prevented. The flow cross sectional area of the orifice 301 is such that the rate of flow of discharge oil passing therethrough is not greater than the rate of flow of supply oil to the cylinder chamber 44 of the driven pulley 34. It will be understood that the orifice 301 restricts the flow of oil discharged from the cylinder chamber 28 of the drive pulley 24 and prevents the occurrence of an undesirable drop in pressure in the cylinder chamber 28 of the drive pulley 24 upon rapid acceleration. Thus, the occurrence of the slip of the V-belt 32 which otherwise would occur upon rapid acceleration is prevented. If in the reverse case the spool 152 is shifted rapidly to the left as viewed in FIG. 6, the rate of flow of oil discharged from the cylinder chamber 44 of the driven pulley 34 is controlled by the orifice 302, thus preventing the occurrence of a rapid drop in pressure which would otherwise occur upon rapid leftward movement of the spool 152.

Figure 8:
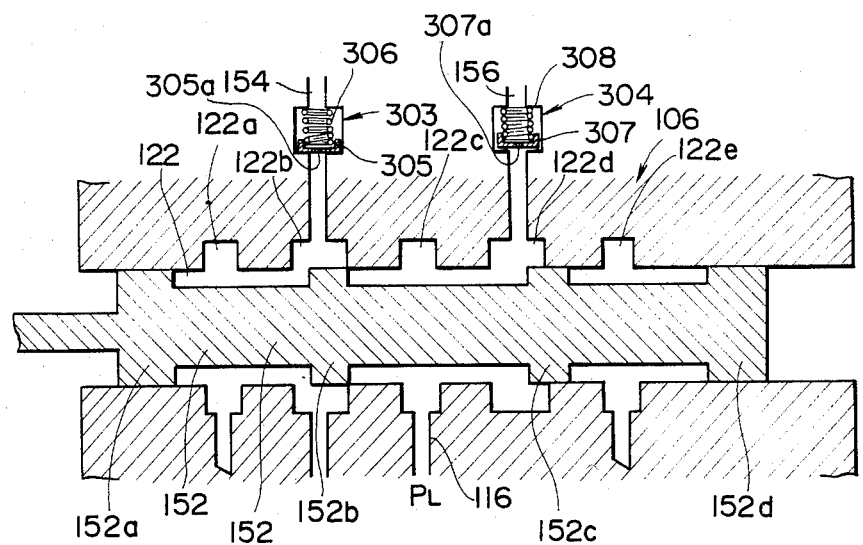
FIGS. 8, 9 and 10 are similar views to FIG. 7 illustrating different shift control valves.

A second embodiment of a shift control valve 106 is illustrated in FIG. 8 wherein the parts similar to the counterparts in FIG. 7 are denoted by the same reference numerals. The shift control valve 106 shown in FIG. 8 is different from the shift control valve shown in FIG. 7 in that a flow restrictor in the form of a one-way flow restricting device 303 is used instead of the orifice 301 and a flow restrictor in the form of a one-way flow restricting device 304 is used instead of the orifice 302. The one-way flow restricting device 303 and 304 are provided in oil conduits 154 and 156, respectively. The one-way flow restricting device 303 includes a cup 305 formed with a small hole 305a and a spring 306. The device 303 is oriented such that the flow of oil discharged from the cylinder chamber 28 of the drive pulley 24 is throttled or restricted although the reverse flow is not restricted. Likewise, the one-way flow restricting device 304 includes a cup 307 formed with a small hole 307a and a spring 308. The device 304 is oriented such that the flow of oil discharged from the cylinder chamber 44 of the driven pulley 34 is restricted although the reverse flow is not restricted. With this arrangement, no resistance is given to the flow of oil supplied to the cylinder chamber 28 of the drive pulley 24 and that supplied to the cylinder chamber 44 of the driven pulley 34. Apparently the operation of the shift control valve illustrated in FIG. 8 is similar to that of the shift control valve shown in FIG. 7.

Figure 9:
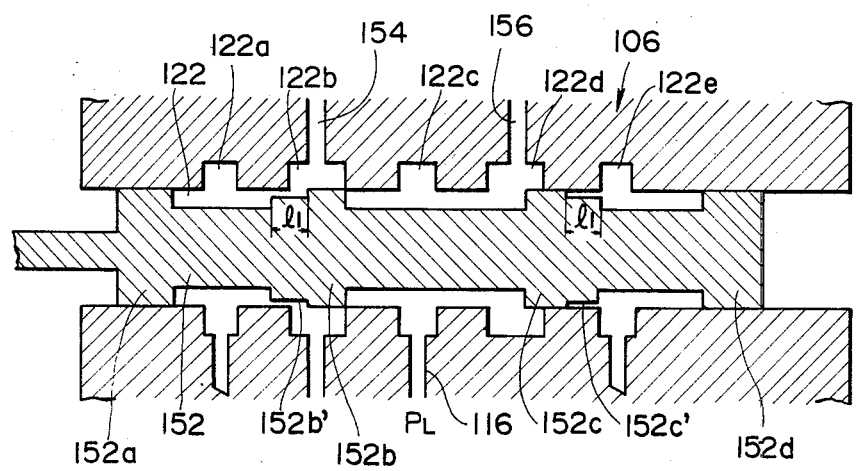

A third embodiment of a shift control valve is illustrated in FIG. 9 wherein the parts similar to the counterparts in FIG. 7 are denoted by the same reference numerals. This embodiment is different from the shift control valve shown in FIG. 7 in that a flow restrictor in the form of a reduced diameter land 152b' is used instead of the orifice 301 and a flow restrictor in the form of a reduced diameter land 152c' is used instead of the orifice 302. The reduced diameter land 152b' adjoins to a first control land 152b and the other reduced diameter land 152c' to a second control land 152c. Each of the reduced diameter lands 152b' and 152c' has a width 11 which is greater than the maximum displacement of the spool 152. Each of the reduced diamter lands 152b' and 152c' is spaced from the adjacent bore wall to define an annular space therearound. The annular space around the reduced diameter land 152b' has a cross sectional area equal to that of the orifice 301 of the shift control valve shown in FIG. 7 and the annular space defined around the reduced diameter land 152c' has a cross sectional area equal to that of the orifice 302. It will be understood that an undesirable drop in pressure in a cylinder chamber 28 of a drive pulley 24 is prevented upon rapid acceleration since the flow of oil discharged from the cylinder chamber 28 via an oil conduit 154 is restricted by the annular space around the reduced diameter land 152b' before entering into a drain port 122a. The flow of oil discharged from a cylinder chamber 44 of a driven pulley 24 passes through the annular space around the reduced diameter land 152c' and is subjected to the flow restriction.

Figure 10:
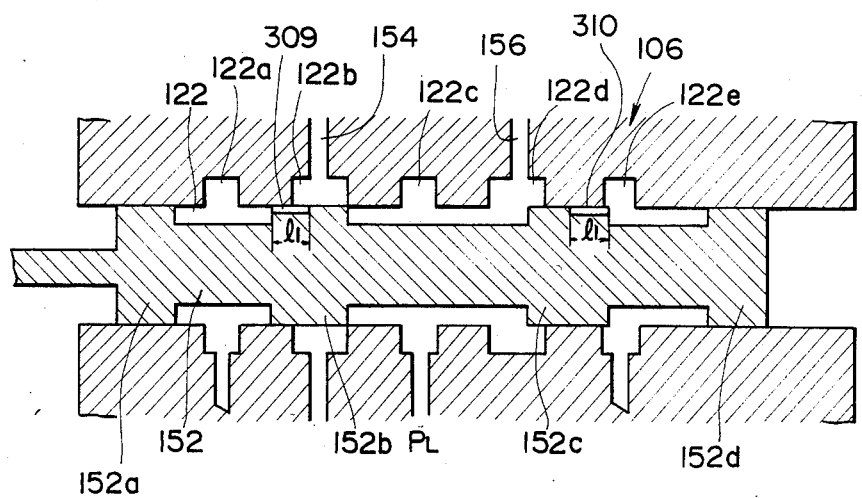
Figure 11:
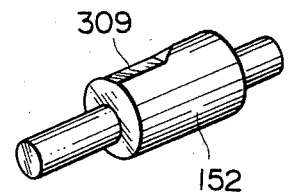
FIG. 11 is a perspective view of a spool of the shift control valve shown in FIG. 10.

A fourth embodiment of a shift control valve is described in connection with FIGS. 10 and 11 wherein the parts similar to the counterparts in FIG. 7 are denoted by the same reference numerals to those used in FIG. 7. This embodiment is different from the shift control valve shown in FIG. 7 in that a flow restrictor in the form of a widened control land 152b formed with a cutout 309 is used instead of the orifice 301 and another flow restrictor in the form of a widened control land 152c formed with a cutout 310 is used instead of the orifice 302. Each of the control lands 152b and 152c has a width greater than the width of the respective outlet port 122b or 122d as illustrated in FIG. 10 and has a width greater than that of the counterparts in FIG. 7 by a length 11. The cutout 309 is formed on the widened portion of the control land 152b and is disposed between a first outlet port 122b and a first drain port 122a. Similarly, the widened portion of the second control land 152c is formed with the cutout 310. Each of the cutouts 309 and 310 cooperates with the adjacent bore wall to define a space or passage through which the flow of oil discharged from the respective cylinder chamber 28 or 44 passes. The space defined by the cutout 309 has a flow cross sectional area equal to that of the orifice 301 of the shift control valve shown in FIG. 7, and the space defined by the cutout 310 has a flow cross sectional area equal to that of the orifice 302 of the shift control valve shown in FIG. 7. As will be readily understood from the above description, the flow of oil dischaged from the cylinder chamber 28 of the drive pulley 24 via an oil conduit 154 is restricted by the space defined by the cutout 309, and the flow of oil discharged from the cylinder chamber 44 of the driven pulley 34 via an oil conduit 156 is restricted by the space defined by the cutout 310. Apparently this embodiment provides substantially the same effect as that provided by the previous embodiments shown in FIG. 8 and FIG. 9.

Figure 12:
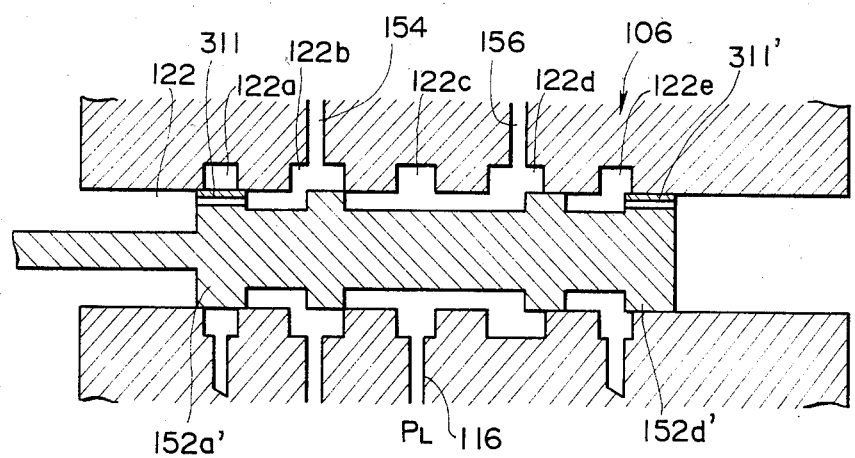
FIG. 12 is a similar view to FIG. 7 illustrating still another different shift control valve.

A fifth embodiment of a shift control valve is illustrated in FIG. 12 wherein parts similar to the counterparts in FIG. 7 is denoted by the same reference numerals. This embodiment is different from the shift control valve shown in FIG. 7 in that endmost lands 152a' and 152d' formed with a drain bore 311 or 311' and so disposed as to close the adjacent drain port 122a or 122e are used as flow restrictors for restricting the flow of discharge oil. The endmost land 152a' is adapted to close the drain port 122a when a spool 152 is shifted to the right as viewed in FIG. 12 to its full stroke to a position illustrated in FIG. 12 and the land 152d' is adapted to close the drain port 122e when the spool 152 is moved to the left by its full stroke to its leftmost position not illustrated. As will be understood from FIG. 12, when the spool 152 is shifted rapidly to the illustrated position upon rapid acceleration, the flow of oil discharged from a cylinder chamber 28 of a drive pulley 24 via an oil conduit 154 is prevented from entering into the drain port 122a and allowed to pass only through the drain bore 311 toward end of valve bore 122 which is drained. The flow is restricted by the drain bore 311. Likewise, when the spool 152 is moved suddenly to its full stroke leftwardly, the flow of oil discharged from a cylinder chamber 44 of a driven pulley 34 via an oil conduit 156 is prevented from entering into the drain port 122d and allowed to pass only through the drain bore 311' toward the adjacent end of the valve bore 122 which is drained. The drain bore 311 has a flow cross sectional area equal to that of the orifice 301 of the shift control valve shown in FIG. 7 and the other drain bore has a flow cross sectional area to that of the orifice 302 of the shift control valve shown in FIG. 7. Obviously, this embodiment provides substantially the same effect as that provided by the previously described embodiments.

What is claimed is:

1. A control system for a continuously variable V-belt transmission having a V-belt running over a drive pulley and a driven pulley, at least the drive pulley having a cylinder chamber, each of the drive and driven pulleys having two conical discs, one conical disc of the drive pulley being secured to a drive shaft, one conical disc of the driven pulley being secured to a driven shaft, the other conical disc of the drive pulley being controllably movable in an axial direction of the drive shaft in response to an oil pressure in the cylinder chamber thereof, the other conical disc of the driven pulley being controllably movable in an axial direction of the driven shaft, the control system comprising:

means for determining the oil pressure in the cylinder chamber of the drive pulley by regulating the flow of oil supplied to and the flow of oil discharged from the cylinder chamber of the drive pulley, said oil pressure determining means defining an oil discharge passage from the cylinder chamber of the drive pulley, said oil discharge passage allowing all of the flow of oil discharged from the cylinder chamber of the drive pulley to pass therethrough; and flow restrictor means for restricting the size of said oil discharge passage so as to always restrict the flow of oil discharged from the cylinder chamber of the drive pulley.

2. A control system as claimed in claim 1, wherein the driven pulley has a cylinder chamber and the controllable movement of the other conical disc of the driven pulley is responsive to an oil pressure in the cylinder chamber of the driven pulley, and said oil pressure determining means determines the oil pressure in the cylinder chamber of the driven pulley by regulating the flow of oil supplied to and the flow of oil discharged from the cylinder chamber of the driven pulley, said second oil pressure determining means defining a second oil discharge passage from the cylinder chamber of the driven pulley, said oil discharge passage allowing the flow of oil discharged from the cylinder chamber of the driven pulley to pass therethrough.

3. A control system as claimed in claim 2, further comprising second flow restrictor means for restricting the size of said second oil discharge passage so as to always restrict the flow of oil discharged from the cylinder chamber of the driven pulley.

4. A control system as claimed in claim 3, wherein said pressure determining means comprises:
   means for supplying a oil under pressure; and
   a shift control valve having a valve bore, an inlet port receiving the oil supplied by said supplying means, a first outlet port communicating with the cylinder chamber of the drive pulley, a second outlet port communicating with the cylinder chamber of the driven pulley, a first drain port, and a second drain port, said shift control valve having a spool slidable in said valve bore, said spool having a first control land cooperable with said first outlet port to control the flow of oil supplied to the cylinder chamber of the drive pulley from said inlet port and the flow of oil discharged from the cylinder chamber of the drive pulley to said first drain port, a second control land cooperable with said second outlet port to control the flow of oil supplied to the cylinder chamber of the driven pulley from said inlet port and the flow of oil discharged from the cylinder chamber of the driven pulley to said second drain port.

5. A control system as claimed in claim 4, wherein said second flow restrictor means is in the form of a reduced diameter land adjoining to said second control land and disposed between said second control land and said second drain port, said reduced diameter land and said valve bore cooperating with each other to define an annular space between said second outlet port and said second drain port.

6. A control system as claimed in claim 4, wherein said second flow restrictor means is in the form of a cutout formed on said second control land, said cutout being disposed between said second outlet port and said second drain port.

7. A control system as claimed in claim 4, wherein said second flow restrictor means is in the form of a land on said spool cooperable with said second drain port to close said second drain port and having a drain bore formed therethrough to allow the oil discharged from the cylinder chamber of the driven pulley cylinder to pass therethrough.

8. A control system as claimed in claim 2, wherein said pressure determining means comprises:
   means for supplying a pressure oil;
   a shift control valve having a valve bore, an inlet port receiving the pressure oil supplied by said supplying means, a first outlet port communicating with the cylinder chamber of the drive pulley, a second outlet port communicating with the cylinder chamber of the driven pulley, a first drain port, and a second drain port, said shift control valve having a spool slidable in said valve bore, said spool having a first control land cooperable with said first outlet port to control the flow of oil supplied to the cylinder chamber of the drive pulley from said inlet port and the flow of oil discharged from the cylinder chamber of the drive pulley to said first drain port, a second control land cooperable with said second outlet port to control the flow of oil supplied to the cylinder chamber of the driven pulley from said inlet port and the flow of oil discharged from the cylinder chamber of the driven pulley to said second drain port.

9. A control system as claimed in claim 8, wherein said flow restrictor means is in the form of a reduced diameter land adjoining to said first control land and disposed between said first control land and said first drain port, said reduced diameter land and said valve bore cooperating with each other to define an annular space between said first outlet port and said first drain port.

10. A control system as claimed in claim 8, wherein said flow restrictor means is in the form of a cutout formed on said first control land, said cutout being disposed between said first outlet port and said first drain port.

11. A control system as claimed in claim 8, wherein said flow restrictor means is in the form of a land on said spool cooperable with said first drain port to close said first drain port and having a drain bore formed therethrough to allow the oil discharged from the cylinder chamber of the drive pulley cylinder to pass therethrough.

* * * * *